UNITED STATES PATENT OFFICE.

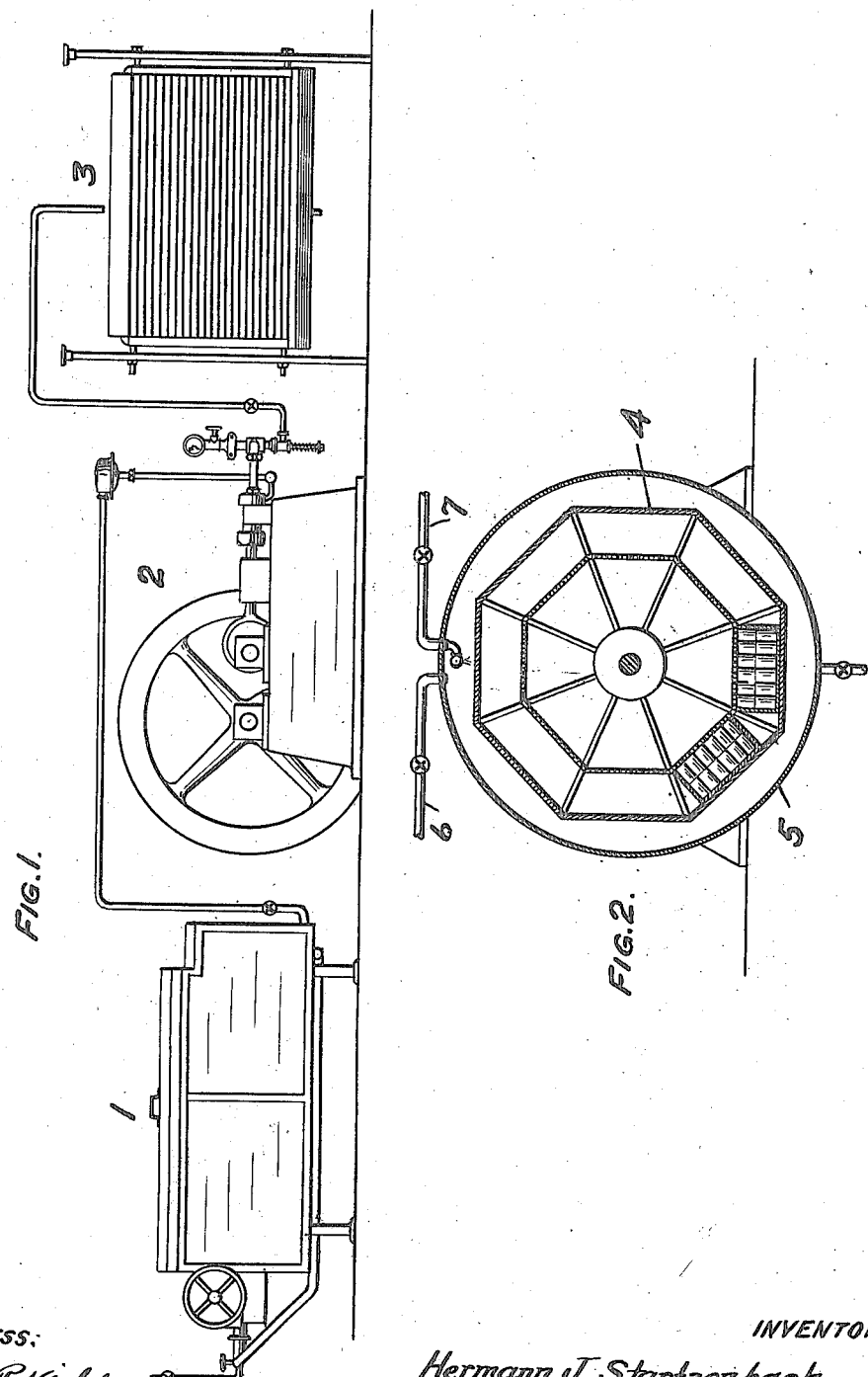

HERMAN J. STARTZENBACH, OF ATLANTIC CITY, NEW JERSEY.

PROCESS OF CANNING MILK.

1,255,483.  Specification of Letters Patent.  Patented Feb. 5, 1918.

Application filed June 23, 1916. Serial No. 105,348.

*To all whom it may concern:*

Be it known that I, HERMAN J. STARTZENBACH, a citizen of the United States, residing at Atlantic City, in the county of Atlantic and State of New Jersey, have invented a certain new and useful Process of Canning Milk, of which the following is a specification.

The principal object of the present invention is to provide an expeditious and reliable process for canning milk and cream in such a way that the canned product will be uniform, will keep almost indefinitely in any climate, will contain no preservative, will not cream up, will not have objectionable cooked characteristics, and will keep for days in a cool place after the cans have been opened. The canned cream is in taste practically indistinguishable from fresh cream although the milk may taste slightly differently from fresh milk and both the canned cream and canned milk are not distinguishable in chemical composition from fresh milk, but they are physically and bacteriologically different. In referring to cans and canning the intention is to include the use of other vessels which, like cans, can be sealed.

My invention involves a process in which use is made of steps, old in themselves, but the process as a whole and in many of its parts or details I believe to be both new and useful and it is adapted to produce a commercially new and unique product.

According to my process of canning, filtered or strained milk or cream is pasteurized and homogenized and cooled. The pasteurized and homogenized and cooled milk or cream is sealed in cans and sterilized at relatively low temperature and at relatively high temperature for certain intervals of time, which are critical, while confined in the cans, and then rapidly cooled. Lime water helps milk or cream to withstand this treatment without undue alteration and therefore I may add from 3 to 6% by weight of that substance or material to the raw milk or cream. The addition of lime water according to medical authorities improves the product for use in feeding children. The temperature to which the canned product is raised in the sterilizer varies with the percentage of butter fat, being higher for milk than for cream. The object is to treat the product in the sterilizer at such temperatures and for such periods of time that it will keep but without imparting to it objectionable cooked characteristics of taste and constituency. For milk containing 8% of butter fat, the temperature in the sterilizer should be substantially 106° C. for 15 minutes, then raised as suddenly as possible to 128° C. for 10 minutes and then suddenly reduced to about 65° C.

The drawings diagrammatically illustrate apparatus useful in the practice of my process of canning milk and cream, and in them Figure 1, is in elevation and Fig. 2, is in transverse section.

Referring to the drawings and to the practice of the invention for canning 8% butter fat milk; strained or filtered milk containing from 3 to 6% by weight of lime water is run through the pasteurizer 1, homogenizer 2, and cooler 3. The cool product is therefore pasteurized and homogenized and it will not cream up and is in a certain sense sterile. This product is canned and the cans are sealed. The canned product at this stage of the process would not keep in all climates or for any considerable length of time. To make the product keep in all climates and practically indefinitely the cans are put into the rotary carrier 4, of the sterilizer 5, and subjected to the heat and pressure of steam at 106° C. for 15 minutes and then the temperature is suddenly raised to 128° C. for 10 minutes, and thereupon the product is suddenly cooled as by means of a cold water spray applied to the cans. 6, are steam and 7, are water connections. The motion imparted to the rotary carrier 4, in respect to the heating and cooling mediums and to the contents of the cans insures uniformity of the product.

For cream the temperature is 102° C. for 15 minutes and then suddenly to 123° C. for (8) eight minutes followed by sudden cooling. Of course some departure is permissible in respect to both temperature and time but I regard those matters as of importance for they seem to be necessary to impart the property of keeping to the product without unduly cooking it or adding preservatives to it. The result of this sterilizing step in the process is to produce products which will keep for very long periods of time, measurable by years, and in all climates in the cans, and which, when the cans are opened, do not possess objectionable cooked characteristics and which will keep, if kept cool, for several days after the cans are opened. Moreover, the product by reason of being homogenized and treated substantially as described does not cream up and responds to all the requirements of pure milk or cream.

I claim:

1. The process of canning milk and cream which consists in pasteurizing and homogenizing and cooling the same, canning the cooled product, sterilizing the product in the cans by the application of heating and cooling mediums, and subjecting the canned product and the heating and cooling mediums to relative movement during sterilization, substantially as described.

2. The process of canning milk and cream which consists in adding lime water to the raw fluid, pasteurizing and homogenizing and cooling the mixture, canning the cooled product, and sterilizing and cooling the canned product, substantially as described.

3. The process of canning a milk product containing 8% butter fat which consists in pasteurizing and homogenizing and cooling the same, canning the cooled product, and sterilizing the cooled product by subjecting it in the cans to steam at 106° C. for 15 ˙nutes and suddenly raising the tempera-
.:e to 128° C. for 10 minutes, and suddenly cooling it, substantially as described.

HERMAN J. STARTZENBACH.